US008847421B2

(12) United States Patent
Bolin

(10) Patent No.: US 8,847,421 B2
(45) Date of Patent: Sep. 30, 2014

(54) SUBSYSTEMS FOR A WATER CURRENT POWER GENERATION SYSTEM

(75) Inventor: William D. Bolin, Spring, TX (US)

(73) Assignee: Anadarko Petroleum Corporation, The Woodlands, TX (US)

( * ) Notice: Subject to any disclaimer, the term of this patent is extended or adjusted under 35 U.S.C. 154(b) by 246 days.

(21) Appl. No.: 13/454,608

(22) Filed: Apr. 24, 2012

(65) Prior Publication Data

US 2012/0292911 A1    Nov. 22, 2012

Related U.S. Application Data

(63) Continuation-in-part of application No. 12/702,546, filed on Feb. 9, 2010, now abandoned, and a continuation-in-part of application No. 12/252,540, filed on Oct. 16, 2008, now Pat. No. 7,851,936.

(60) Provisional application No. 61/259,359, filed on Nov. 9, 2009, provisional application No. 61/135,072, filed on Jul. 16, 2008.

(51) Int. Cl.
*F03D 9/00* (2006.01)
*F03B 17/06* (2006.01)

(52) U.S. Cl.
CPC .......... *F03B 17/061* (2013.01); *F05B 2240/40* (2013.01); *F05B 2240/97* (2013.01); *F05B 2240/93* (2013.01); *Y02E 10/28* (2013.01)
USPC ........................................................ 290/55

(58) Field of Classification Search
USPC ........................................................ 290/55
See application file for complete search history.

(56) References Cited

U.S. PATENT DOCUMENTS

| 7,525,212 | B1 * | 4/2009 | Catlin | 290/53 |
| 7,785,065 | B2 * | 8/2010 | Clemens | 415/5 |
| 8,035,243 | B1 * | 10/2011 | Mesa | 290/53 |
| 8,446,026 | B2 * | 5/2013 | Henriksen | 290/42 |
| 8,466,574 | B2 * | 6/2013 | Bear et al. | 290/53 |

(Continued)

FOREIGN PATENT DOCUMENTS

| GB | 2256011 A | 11/1992 |
| RU | 1813186 A3 | 4/1993 |

(Continued)

OTHER PUBLICATIONS

Notification of Transmittal of the Eurasian Patent Search Report and the Written Opinion of the International Searching Authority, or the Declaration issued on Jul. 23, 2012 by the EU International Searching Authority in International Application No. 201270725.

(Continued)

*Primary Examiner* — Truc Nguyen
(74) *Attorney, Agent, or Firm* — Raymond R. Ferrera; Adams and Reese LLP

(57) ABSTRACT

Various subsystems for a submerged or waterborne system used to generate power derived from fast-moving water currents using an induction-type generator system equipped with one or more fin-ring propellers are disclosed. Many of the systems and subsystems shown and described herein are individually suitable for use in systems using conventional generator drive systems and other means of power creation. Means for transmission of power generated by such systems, tethering and mooring systems, and methods for improving system transportation, installation and maintenance are also disclosed.

12 Claims, 13 Drawing Sheets

(56) References Cited

U.S. PATENT DOCUMENTS

| | | |
|---|---|---|
| 8,558,402 B2 * | 10/2013 | Krouse et al. .................. 290/52 |
| 2005/0285404 A1 | 12/2005 | Tharp |
| 2006/0232072 A1 | 10/2006 | Manchester |
| 2010/0232962 A1 | 9/2010 | Bolin |
| 2011/0041747 A1 | 2/2011 | Reusch |

FOREIGN PATENT DOCUMENTS

| | | |
|---|---|---|
| RU | 2166454 C2 | 5/2001 |
| RU | 2185994 C2 | 7/2002 |
| RU | 2007126325 A | 1/2009 |
| RU | 2405966 C2 | 12/2010 |
| RU | 109113 U1 | 10/2011 |
| SU | 1134465 A | 1/1985 |
| WO | 2008114019 A2 | 9/2008 |

OTHER PUBLICATIONS

Notification of Transmittal of the Eurasian Patent Search Report and the Written Opinion of the International Searching Authority, or the Declaration issued on Jul. 23, 2012 by the EU International Searching Authority in International Application No. 201270726.

Notification of Transmittal of the Eurasian Patent Search Report and the Written Opinion of the International Searching Authority, or the Declaration issued on Jul. 23, 2012 by the EU International Searching Authority in International Application No. 201270665.

* cited by examiner

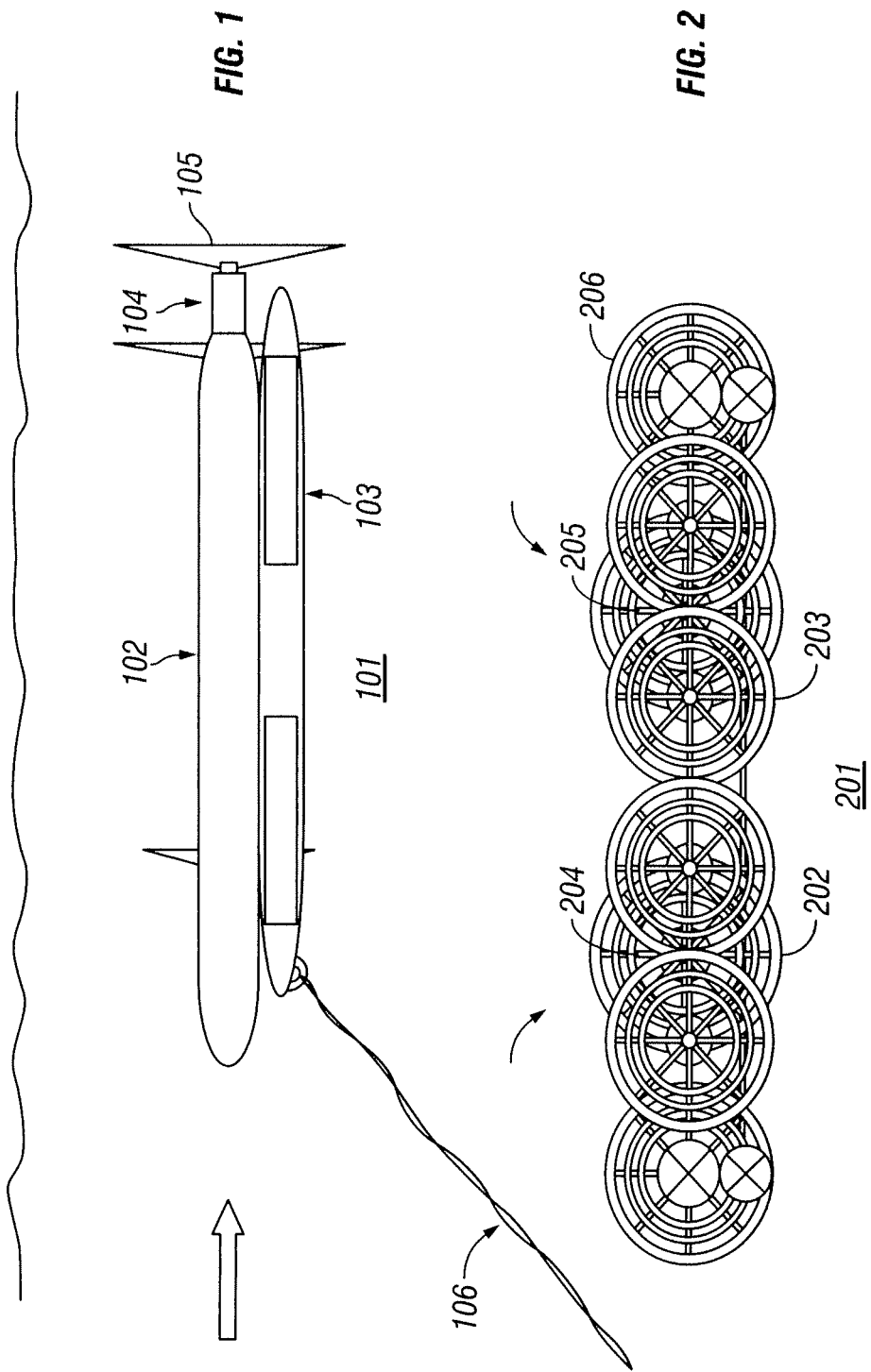

SUBSYSTEMS FOR A WATER CURRENT POWER GENERATION SYSTEM

STATEMENT OF RELATED CASES

The present application is a continuation-in-part of U.S. Non-Provisional application Ser. No. 12/702,546 filed Feb. 9, 2010 now abandoned, which claims the benefit of prior U.S. Provisional Application No. 61/259,359 filed Nov. 9, 2009; U.S. Non-Provisional application Ser. No. 12/702,546 is a continuation-in-part of U.S. Non-Provisional application Ser. No. 12/252,540 filed Oct. 16, 2008, now issued as U.S. Pat. No. 7,851,936, which claims the benefit of prior U.S. Provisional Application No. 61/135,072 filed Jul. 16, 2008.

FIELD OF THE INVENTION

The present invention relates generally to renewable energy power generation systems, and in a particular though non-limiting embodiment, to subsystems for a submerged or waterborne system for generating power derived from fast-moving water currents using an induction-type generator system equipped with one or more fin-ring propellers.

In addition to the illustrative embodiments presented in this disclosure, many of the systems and subsystems described and claimed herein are individually suitable for systems using conventional generator drive systems and other means of power creation.

Means for transmission of power generated by such systems to neighboring power grids, mooring systems, and method and means for installing and maintaining components of such systems are also disclosed.

BACKGROUND OF THE INVENTION

With the rising cost of fossil fuels and increased energy demand in the world's economies and industries, different and more efficient methods of developing energy sources are constantly being sought. Of particular interest are renewable alternative energy sources, such as solar power devices with batteries, windmill farms, tidal power generation, wave generators, and systems deriving power from sequestered hydrogen.

However, such energy sources are not yet capable of delivering continuous power to a widespread area on a commercial scale. Moreover, some proposed technologies, such as hydrogen powered systems involving the refinement of seawater, actually consume more power in the conversion process than is output at the end of the system.

Others, such as hydrogen derived from methane, produce equal or greater amounts of fossil fuel emissions than the conventional oil-based technologies they are intended to replace, and still others, such as battery, solar and windmill based systems, require such consistent exposure to significant sunlight or winds that their commercial effectiveness is inherently limited.

One proposed alternative energy system involves the harnessing of hydro power derived from fast moving water currents, for example, currents having peak flow velocities of 2 m/s or more.

In practice, however, existing underwater power generating devices have proven inadequate, even where installed at sites where current velocities are consistently very fast. This is due, at least in part, to both a lack of efficient means for generating the power and lack of suitable power transformation systems necessary to compensate for incompatibilities between underwater power generating systems and attendant land or waterborne power relay stations.

Existing propeller designs and waterborne power generating mechanisms have also proven to be inadequate, failing to provide either adequate energy generation or sufficient stability against maximum or velocity currents.

To capture a significant amount of kinetic energy from flowing ocean currents, the affected area must be expansive. As a result, existing marine propeller designs employ prohibitively large, heavy and expensive structures made from currently known heavy metal and composite metal technologies. Moreover, these marine propellers create cavitation issues originating from the tips of the propeller blades moving through surrounding water.

Another significant problem is the environmental issues associated with obtaining energy from water currents without damaging surrounding aquatic life, such as reefs, marine foliage, schools of fish, etc.

There is, therefore, an important and as yet unmet need for a water current power generation system and accompanying subsystems that overcome the problems currently existing in the art, and which generate and compatibly transfer a significant amount of power to a relay station in a safe, reliable, and environmentally-friendly manner. Safe and efficient field-level configurations, reliable and repeatable mooring systems, and methods and means for installing and maintaining such systems are also required.

SUMMARY OF THE INVENTION

A consolidation facility for consolidating power generated by a plurality of water current power generation systems is provided, wherein each of the power generation systems includes at least one or more submerged flotation chambers. One or more of the submerged flotation chambers further includes at least one or more buoyant fluid isolation chambers, and one or more of the isolation chambers further includes a buoyant fluid disposed therein, a buoyant fluid intake valve, a buoyant fluid exit valve, and a buoyant fluid source control means.

The power generation units also include one or more submerged induction type power generation units disposed in communication with the flotation chambers; one or more propellers disposed in communication with the power generator units; a mooring system; and a generated power output means.

The consolidation facility further includes means for receiving power generated by said power generation systems, transferring or exporting power via the output means, and delivering consolidated power to a neighboring power grid, either directly or following transfer to an intervening power transformation device.

The consolidation facility may be located on the ocean floor, in mid-water, or floating on the surface. In one specific example, a floating or submerged SPAR (a stable platform with a suitable deep draft or other hull) is used as a consolidation facility; alternatively, a submerged structure will offer greater freedom for vessel navigation in the area.

The consolidation facility is optimally moored in a secure fashion, for example, using a poly rope, which can be formed from a portion wound in a single direction; two or more layered portions wound in alternate directions; combined or replaced with metal cabling; and/or wrapped around the consolidated power output line.

The power generation pods and propellers can be installed and maintained by rotating them into a horizontal position. While still in the water, a buoyant center nose cone gives the propellers adequate flotation to reach the surface and maximum stability from wind, current or other weather conditions once at the surface level. In this manner, installation and maintenance of the units are safely and efficiently achieved.

BRIEF DESCRIPTION OF THE DRAWINGS

The embodiments disclosed herein will be better understood, and numerous objects, features, and advantages made apparent to those skilled in the art by referencing the accompanying drawings.

FIG. 1 is a side view of a water current power energy generation system according to one example embodiment of the invention.

FIG. 2 is a front view of a water current power energy generation system according to a second example embodiment of the invention.

DETAILED DESCRIPTION OF SEVERAL EXAMPLE EMBODIMENTS

Figure 3:
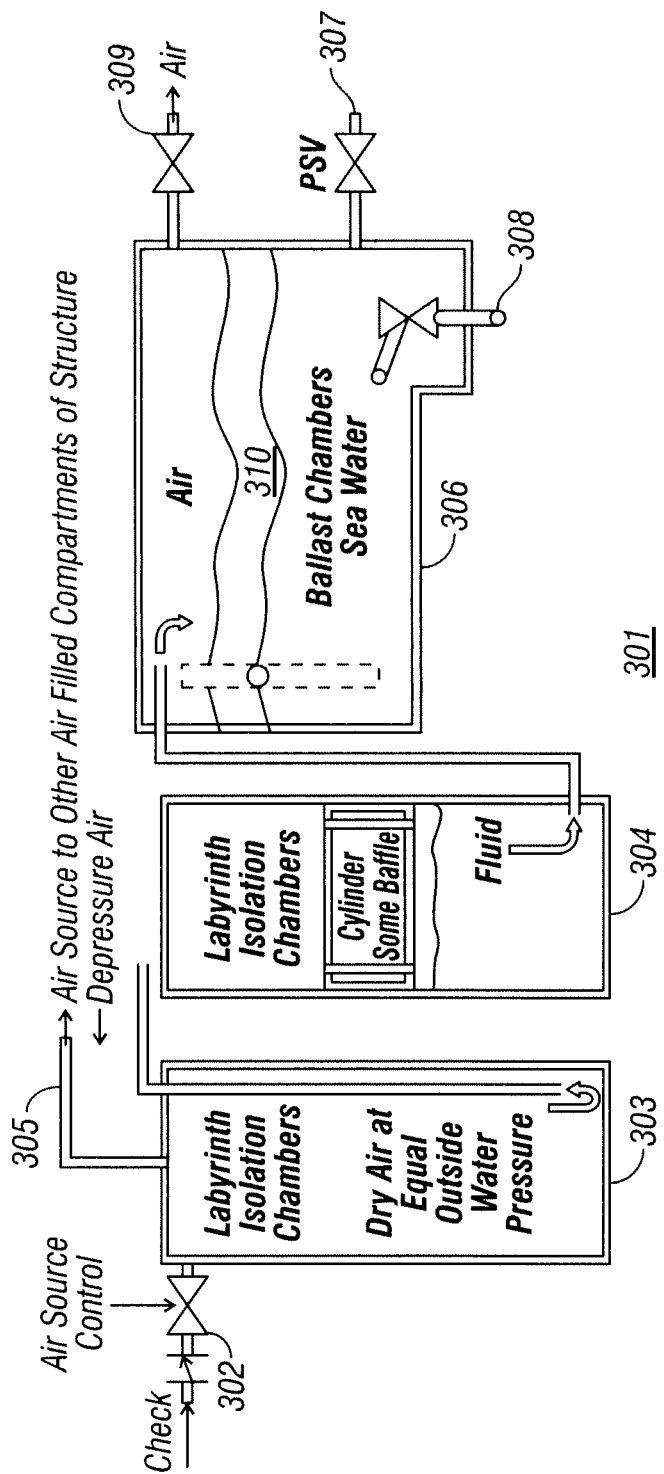
FIG. 3 is a plan view of a ballast tube having a plurality of labyrinth type isolation chambers according to a third embodiment of the invention.

The description that follows includes a number of exemplary system designs and methods of use that embody advantages of the presently inventive subject matter. However, it will be understood by those of ordinary skill in the art that the disclosed embodiments will admit to practice without some of the specific details recited herein. In other instances, well-known sub-sea and power generating equipment, protocols, structures and techniques have not been described or shown in detail in order to avoid obfuscation of the invention.

FIG. 1 depicts a first example embodiment of a water current power generation system 101. In its simplest form, the system comprises one or more of a flotation tube 102, a ballast tube 103, and an induction type power generation unit 104 equipped with a shaft-driven propeller 105.

While FIG. 1 depicts only a single flotation tube 102, ballast unit 103 and generator component 104, larger systems comprising a plurality of any or all such structures is also contemplated. In any event, those of skill in the pertinent arts will readily appreciate that the instant description of a limited system with singular elements is merely illustrative, and is not intended to limit the scope of the subject matter with respect to plural members of any of the elements disclosed herein.

In one example embodiment, a power generation unit 104 (for example, an induction type power generation unit) produces electrical power that can be output either with or without transformation as either an alternating current (AC) or a direct current (DC) to an associated relay station or other means for facilitating transfer of power from offshore to a neighboring power grid or the like.

Generally, asynchronous induction-type generators are mechanically and electrically simpler than other types of synchronous electrical power generators or direct current (DC) generators. An induction motor converts to an outputting power generator when the energy for the magnetic field comes from the stator or when the rotor has permanent magnets creating a magnetic field thereby imparting negative slip. They also tend to be more rugged and durable, usually requiring neither brushes nor commutators. In most cases, a regular AC asynchronous motor is used as the generator, without any internal modifications.

In normal motor operation, the stator flux rotation of the motor is set by the power frequency (typically around 50 or 60 Hertz) and is faster than the rotor rotation. This causes stator flux to induce rotor currents, which in turn creates rotor flux having a magnetic polarity opposite the stator. In this manner, the rotor is dragged along behind the stator flux in value equal to the slip.

A three-phase asynchronous (e.g., cage wound) induction machine will, when operated slower than its synchronous speed, function as a motor; the same device, however, when operated faster than its synchronous speed, will function as an induction generator.

In generator operation, a prime mover of some sort (e.g., a turbine, engine, propeller drive shaft, etc.) drives the rotor above the synchronous speed. Stator flux still induces currents in the rotor, but since the opposing rotor flux is now cutting the stator coils, active current is produced in stator coils, and thus the motor is now operating as a generator capable of sending power back toward a neighboring electrical grid.

Therefore, induction generators can be used to produce alternating electrical power whenever an internal shaft is rotated faster than the synchronous frequency. In various embodiments of the present invention, shaft rotation is accomplished by means of an associated propeller 105 disposed in a relatively fast moving water current, though other methods and means of shaft rotation could also be conceived and applied to similar effect.

Since they do not have permanent magnets in the rotor, one limitation of induction generators is that they are not self-exciting; accordingly, they require either an external power supply (as could easily be obtained from the grid using an umbilical run either through the water or beneath an associated seafloor), or "soft started" by means of a reduced voltage starter in order to produce an initial rotation magnetic flux.

Reduced voltage starters can lend important advantages to the system, such as quickly determining appropriate operational frequencies, and permitting an unpowered restart in the event the attendant power grid is deactivated for some reason, for example, as a result of damage caused by a hurricane or other natural disaster.

Power derived from the system will, at least in some cases, likely be used to supplement a neighboring power grid system, and thus the operating frequencies of the grid will in large part dictate the frequency of operation for the power generation system, For example, the vast majority of large power grid systems currently employ a nominal operating frequency of between 50 and 60 Hertz.

Another important consideration for large waterborne power generating systems is the establishment of a well-balanced flotational equilibrium that allows for continuous dynamic position regardless of surrounding current velocities.

Even assuming that surrounding current velocities remain within a predetermined range of acceptable operating velocities, system equilibrium could still be jeopardized by an especially powerful hurricane or the like, but disposition of the system well under the line of typical wave force, i.e., approximately 100-150 feet deep or so, will greatly reduce such disturbances. The various offsetting forces of gravitational kips, flotation kips, drag kips and holding kips will also contribute to the overall stability of a continuous water current energy generating system.

The flotation tube 102 illustrated in FIG. 1 comprises a cylindrical body portion disposed in mechanical communication with at least one end cap unit 104 that houses the aforementioned induction generators. The generators and associated end cap housings contain a drive shaft and, in some embodiments, related planetary gearing for propeller 105.

In some embodiments, flotation tube 102 comprises a cubical or hexagonal shape, though effective practice of the invention will admit to other geometries as well. In a presently preferred embodiment, flotation tube 102 is approximately cylindrical, and pressurized with gas (e.g., air or another safe, buoyant gas) so that, when the system is restrained by anchored tether 106, the combined forces will constitute the primary lifting force for the ocean current energy generating system.

Accordingly, the system can be raised to the surface for maintenance or inspection by turning off the generators, thereby reducing drag on the system, which allows the system to rise somewhat toward the surface. By opening the flotation tube(s) and/or evacuating fluid from the ballast tube(s), the unit can be safely and reliably floated to the surface so that maintenance or inspection can be performed.

According to a method of moving the system, tether 106 can also be released, so that the floating structure can be towed or otherwise powered toward land or another operating site.

The example embodiment depicted in FIG. 2 is a front view of the power generation system 201, equipped with a plurality of relatively large, slow moving propellers 206 disposed in mechanical communication with the shaft members of induction generator units 204 and 205. As seen in greater detail in FIG. 4A, the generator units are disposed within end cap units housed within flotation tubes 102, as well as across the span of a lattice type body portion of the system disposed between the flotation tubes.

Turning now to FIG. 3, a detailed view of the inside of the ballast tubes previously depicted as item 103 in FIG. 1 is provided, in which a plurality of labyrinth type isolation chambers are joined in such a manner that separation and mixture of various gases and liquids can be used to permit much finer control of the balance and flotational forces present in the system than can be obtained by means of floatation tubes 102 alone.

As seen in the illustrated embodiment, an interior ballast system 301 formed within a ballast tube comprises an air control source 302 disposed in fluid communication with an overpressure check valve and a first isolation chamber 303.

First isolation chamber 303 contains both a dry gas (e.g., air having a pressure equal to the surrounding outside water pressure) present in an upper portion of the chamber, and a fluid (e.g., seawater drawn in from outside the isolation chamber) present in a lower portion of the chamber.

First isolation chamber 303 also comprises a secondary air feed line 305 for distributing air to other gas-filled compartments of the structure, as well as lines for mixtures of gas and fluid from first isolation chamber 303 to second isolation chamber 304. Second isolation chamber 304 in turn comprises an upper portion containing air and a lower portion containing water or the like, which are separated by an isolation cylinder. In other embodiments, the isolation cylinder contains sea water upon which floats a barrier fluid in order to ensure better isolation between the air and seawater.

In further embodiments, either (or both) of the first and second isolation chambers 303, 304 is equipped with instrumentation (e.g., pressure sensors or differential pressure sensors) to determine whether fluid or air is present in a particular cavity of the system. In still further embodiments, such sensors are input into a logical control system (not shown) used to assist in the detection and control of balance and thrust related measurements.

The process of advancing air through the system in upper portions of the tanks while ensuring that water or other liquids remain in the lower portions is continued until desired balance and control characteristics are obtained. Ultimately, a final isolation chamber 306 is provided, which, in the depicted embodiment, comprises an air outlet valve 309 used to let air out of the system and, in some circumstances, water into the system.

A pressure safety valve 307 is provided in the event internal pressures become so great that venting of pressure is required in order to maintain the integrity of system control, and an open water flow valve 308 fitted with a screen to prevent accidental entry by sea creatures is disposed in a lower portion of the isolation tank 306.

Again, barrier fluids and the like can be used to reduce interaction between air and water, and when the system is fitted with a float control floating on top of the sea water, the barrier fluid will be retained even after all of the sea water is expelled. Also, greater stability can be achieved in the tanks using a series of baffles to ensure water trapped in the tanks does not move quickly within the chambers, which would otherwise tend to disrupt balance and control. Moreover, multiple tanks and sectionalization will be employed to address possible unit tilt, so that water and gas are appropriately diverted to prevent excessive tilt.

Figure 4B:
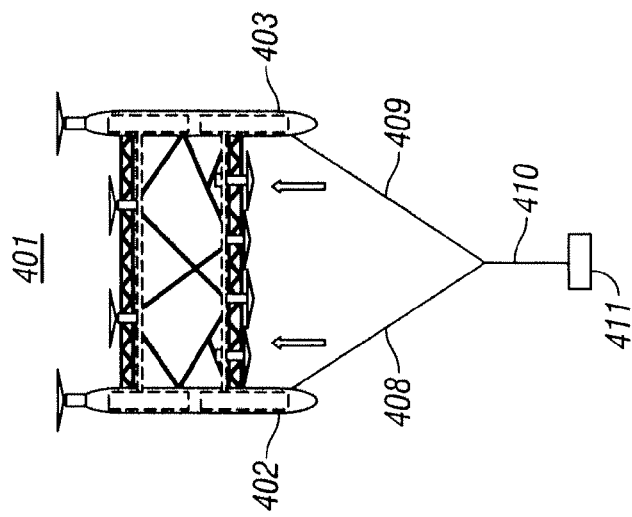
FIG. 4B is a top view of the example embodiment depicted in FIG. 4A, further including an associated tether anchoring system.
Figure 4A:
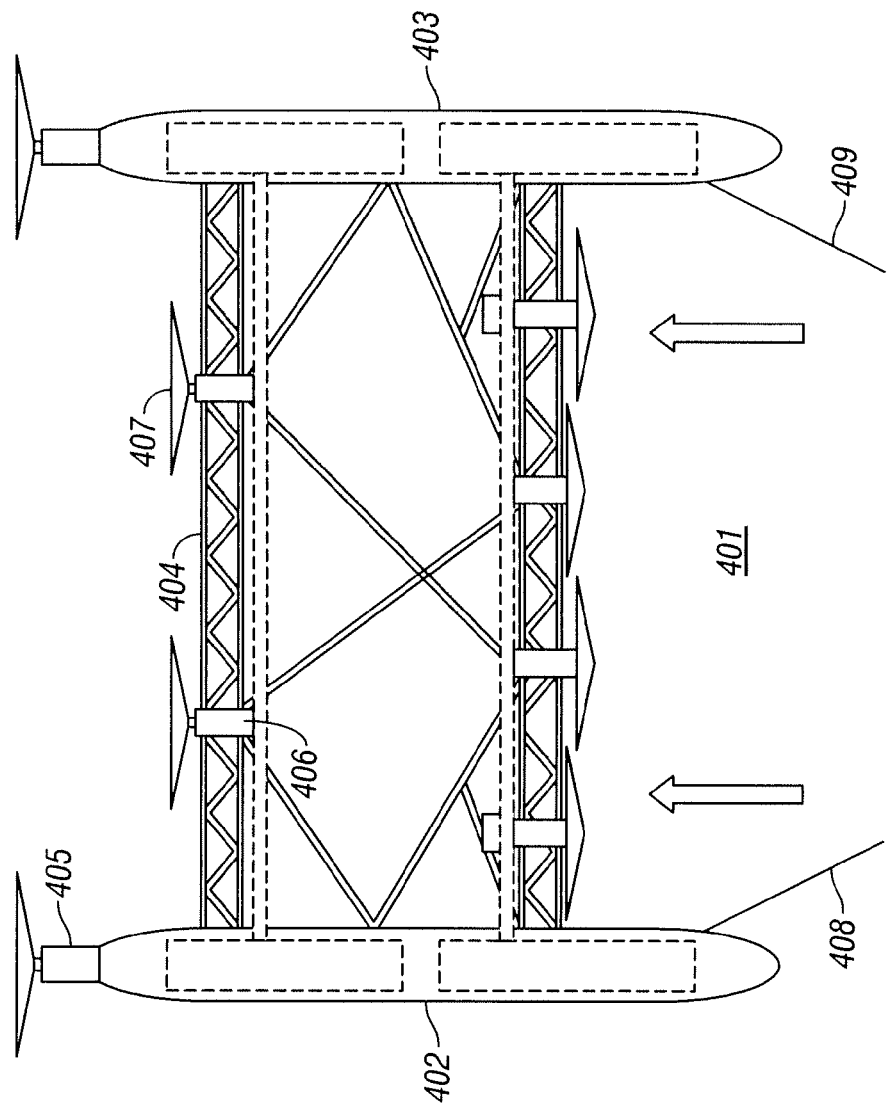
FIG. 4A is a top view of a water current power energy generation system according to a fourth example embodiment of the invention.

FIG. 4A presents a top view of one embodiment of the system 401, which in this instance comprises a first flotation tube 402 and a second flotation tube 403; a connecting, lattice like body portion 404 disposed therebetween; a plurality of induction generators 405, 406 positioned strategically around the floatation tubes and the body portions; a plurality of propellers 407 disposed in mechanical communication with the generators; and a plurality of tethering members 408, 409 disposed in mechanical communication with the flotation tubes 402, 403.

In the example embodiment depicted in FIG. 4B, tethering members 408 and 409 are joined to form a single anchoring tether 410 that is affixed in a known manner to anchoring member 411.

In various embodiments, anchoring tether 410 further comprises means for variably restraining and releasing the system. In various other embodiments, anchoring tether 410 terminates at an anchoring member 411 equipped with a tether termination device (not shown). Anchoring member 411 comprises any type of known anchor (e.g., a dead-weight anchor, suction anchor, etc.) suitable for maintaining a fixed position in fast moving currents, which are usually found in locations with rocky seafloors due to soil erosion caused by the fast moving currents.

In still other embodiments, this portion of the station can be secured by attaching anchoring tether 410 to either a surface vessel or another ocean current energy generating device, or to another central mooring location such as a floating dynamic positioning buoy.

Figure 5:
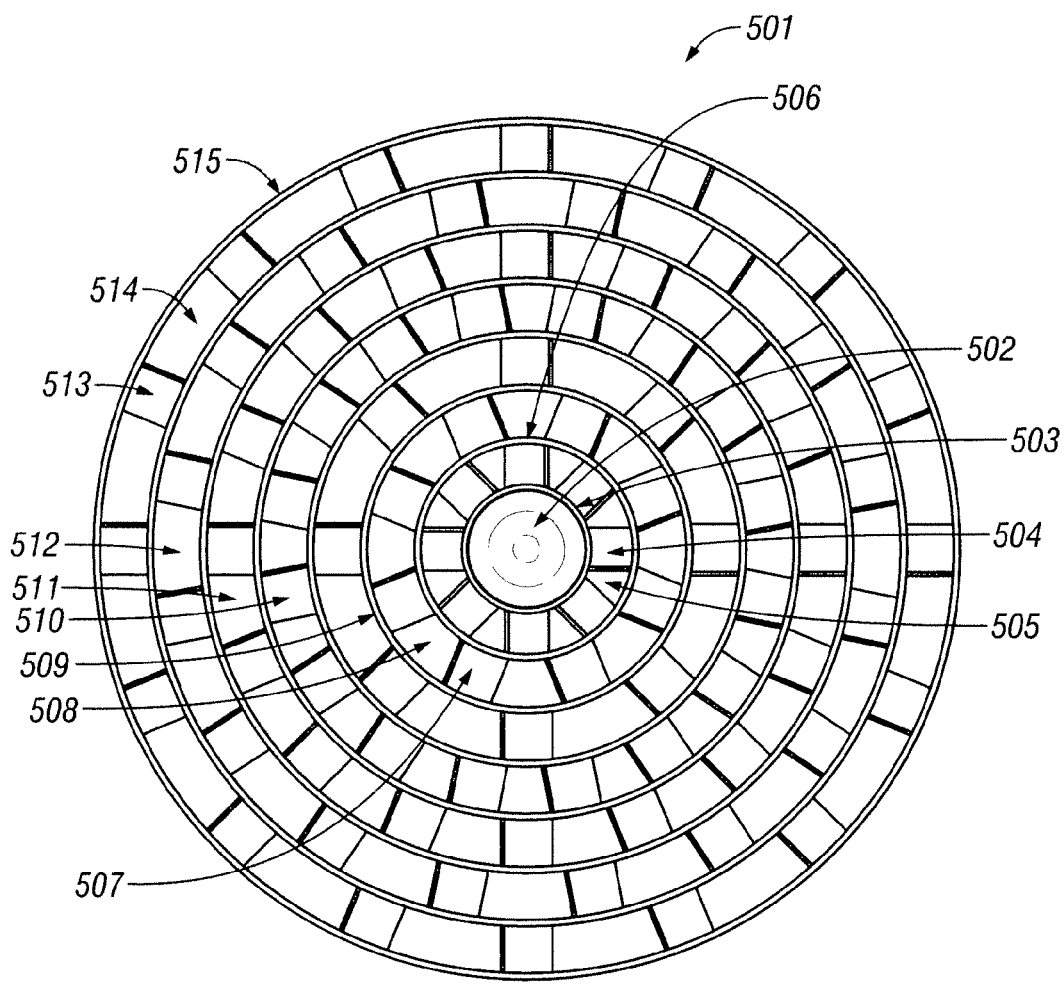
FIG. 5 is a front view of an example propeller system embodiment suitable for use in connection with a submerged or waterborne power generation system.
Figure 6:
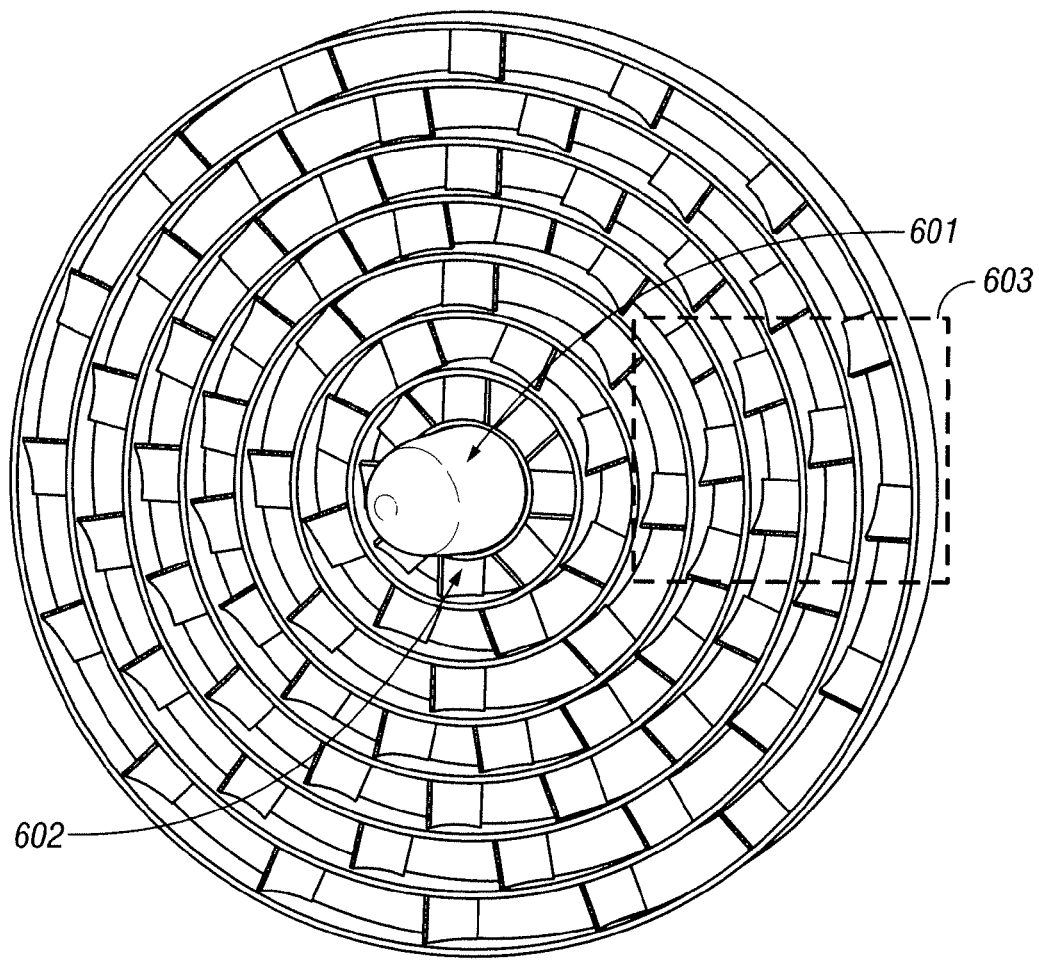
FIG. 6 is a perspective view of the example propeller system embodiment depicted in FIG. 5, with a detailed portion of the system isolated for additional perspective.
Figure 7:
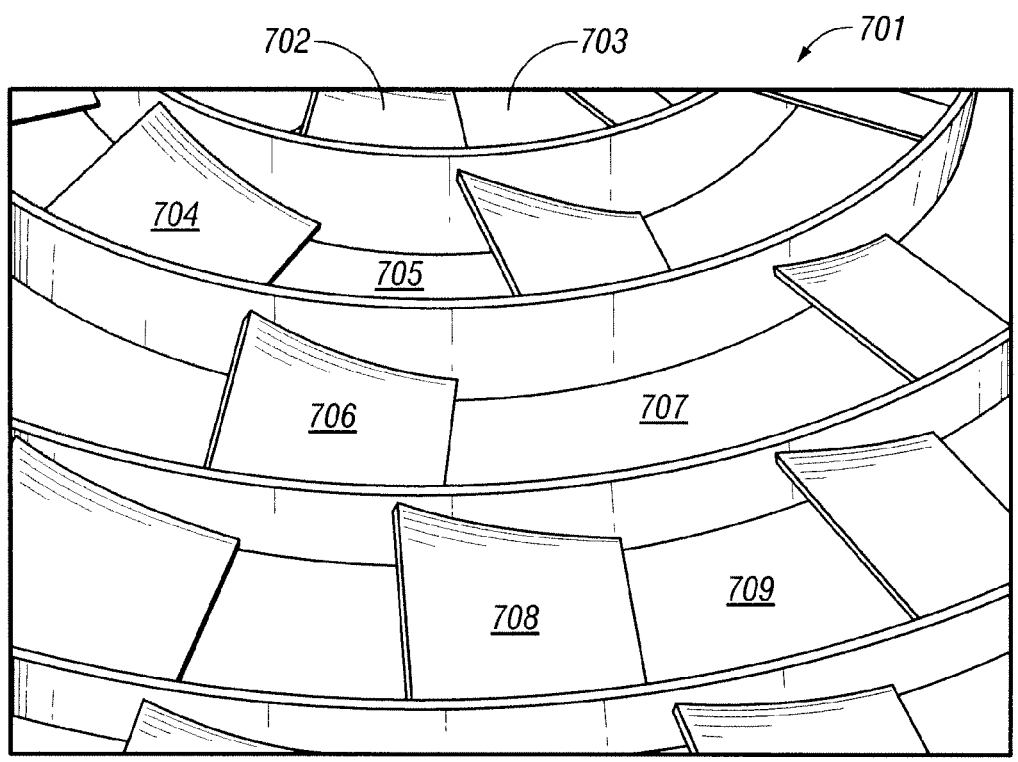
FIG. 7 is an isolated view of a portion of the example propeller system embodiment depicted in FIGS. 5 and 6.

Turning now to example propeller system embodiments discussed only very generally above, FIGS. 5-7 depict several specific though non-limiting example embodiments of a propeller system suitable for use with the water current power generation system disclosed herein.

Those of ordinary skill in the pertinent arts will also appreciate, however, that while the example propeller systems disclosed herein are described with reference to a water current power generation system driven by an induction-type power generator, the example propeller systems can also be used in connection with other types of submerged or waterborne power generation systems to achieve many of the same advantages taught herein.

FIG. 5, for example, is a front view of an example propeller system embodiment suitable for use in connection with a submerged or waterborne power generation system.

As depicted, propeller 501 comprises a plurality of alternating fin sets and enclosing rings, which will hereinafter be referred to as a "fin-ring" configuration. Such fin-ring propellers would typically be designed to specification for each particular application, and improved efficiency will be realized by tailoring the diameter, circumference, fin curvature and disposition eccentricity, material selections, etc., based on the operational frequencies required by the induction generators, the speed of surrounding water currents, environmental considerations (e.g., whether the propellers should have openings or voids through which fish or other aquatic life may pass), and so on.

Similarly, neighboring sets of propellers can be rotated in opposite directions (e.g., either clockwise or counterclockwise, as representatively depicted in FIG. 2) in order to create eddies or dead zones in front of the propellers, which can repel or otherwise protect marine life, enhance propeller rotation efficiency, etc.

When used in connection with a water current power generation system driven by an induction-type power generator, the only firm operational requirement for the propellers is that they are capable of rotating associated generator shafts at the speeds required to obtain operational generator frequencies.

However, it is highly desirable that the system as a whole remains passive with respect to interaction with local marine life, and optimal performance results are achieved when the system generates the required power output while still maintaining an environmentally neutral operating environment.

Beginning in the center of the device, it is seen that propeller 501 is disposed around a hub or shaft portion 502 that both holds the propeller 501 securely (e.g., by means of mechanical affixation, such as encapsulated rust-resistant fasteners, welding a propeller body or multiple pieces of a propeller body to a shaft into a single unitary whole, etc.) and imparts a rotational torque proportional to the angular momentum of the rotating propeller onto the shaft for delivery to the power generator.

In some embodiments, hub or shaft portion 502 further comprises a flotation means to improve the mechanical connection of the fin-ring propeller to the shaft, and to prevent overhang of the propeller that would otherwise tend to deform or stress the shaft. Like the affixation means, drive shafts appropriate for this task currently exist in the art of record, and may comprise, for example, a series of gears and/or clutches, braking systems, etc., as would be required to effectively communicate the propeller's rotational torque to the generator shaft.

In one specific embodiment, a retaining fastener such as a bolt and washer assembly or the like is removed from the end of a drive shaft, the fin-ring propeller structure is slipped over the exposed shaft, and then the fastener is replaced, thereby mechanically affixing the fin-ring structure to the shaft. Optimally, the fastener would then be covered by a buoyant watertight cover or the like as representatively depicted in FIG. 6, item 601.

In other embodiments, a central hub comprises the connection point mechanical communication with a large shaft, which can be either installed or removed and replaced as a single structure so that the propeller can be easily serviced and maintained while in the water.

In other embodiments, the system further comprises a flotation means in order to resist the overhanging load of the shaft and propeller assembly. For example, liquid foam or other light fluid chemicals, or even compressed air, can be loaded into a nose cone that fits over the end of a propeller hub, so that the propeller is free to rotate around a drive shaft behind the buoyant nose cone, thereby lifting the weight of the assembly so that heavy overhanging loads are avoided.

Similarly, the propellers (especially the front propellers in a submerged system, which absorb most of the force of the water current) can be drag mounted to overcome resistance attributable to cumulative fluid pressure against the fin-ring structure.

Regardless of how the propeller is affixed to the shaft and whether it is drag mounted and/or supported by a flotation member, the exemplary embodiment of the fin-ring design depicted herein is generally similar across a multitude of other, related embodiments suitable for practice within the system.

For example, in the embodiment depicted in FIG. 5, the hub attachment assembly 502 is concentrically surrounded by a first ring member 503, beyond which (i.e., further out from the hub assembly) is a second ring member 506. Disposed between first ring member 503 and second ring member 506 is a plurality of fin members 504, each of which is separated by a gap 505.

The gap space between fin members 504 will vary by application, but as a general matter the gaps between fins will increase in size from the inner most ring (in which the gaps are typically the smallest) to the outermost rings (where the gap space is the largest).

Other configurations admit to gaps of similar sizes, or even larger gaps on inner rings than on outer rings, but an advantage of a mostly solid inner ring surface, wherein most of the entirety of the ring's possible surface area is utilized by fins rather than gaps, is that the structure will tend to force fluid pressure away from the center of the structure toward the outermost rings and beyond the perimeter of the device.

This approach helps the propeller rotate more easily, and more than sufficiently addresses environmental concerns by forcing small marine life and the like toward the outside of the system, so that they can either avoid the propeller structure altogether, or else pass through one of the slow moving larger gaps in the outer rings.

Since resistance against the structure is reduced and greater rotational torque is transmitted to the drive shafts with less drag and loss, the propeller can also be rotated very slowly (in one example embodiment generating satisfactory field results, the propeller rotates at a speed of only 8 RPM), further ensuring that marine life will be able to avoid the structure and enhancing environmental neutrality and safety. The slow rotational speeds also make the system more rugged, durable and less likely to suffer damage if contacted by debris or a submerged object floating nearby.

Successive concentric rings of fins 507 and gaps 508 disposed within additional approximately circular rings 509 are then added to the structure, thereby creating additional concentric rings of fins and gaps 510-512 until the desired circumference has been achieved. In a presently preferred embodiment, the gap spaces 514 of the outermost ring are the largest gap spaces in the system, and separate fins 513 to the system's greatest extent.

A final ring member 515 encloses the outer periphery of the propeller system, again providing further environmental protection, as marine life inadvertently striking the outside ring 515 will encounter only a glancing blow against a slowly-moving structure, while water and fluid pressures are forced away from the device as much as possible.

As seen in the boxed region 603 of FIG. 6 (which generally depicts the example embodiment of FIG. 5, though with the hub attachment portion covered with a water-proof cap 601 or the like), the pitch of fins 602 measured relative to the plane of the fin-ring assembly can be altered.

For example, the fins can be disposed with greater eccentricity as their position within the assembly is advanced from the first ring surrounding the central hub toward the outermost rings. Disposing fins 602 at a flatter pitch within the interior rings and more eccentrically (i.e., in a plane more perpendicular to the assembly plane) in the outer rings will tend to flatten and smooth the water flow around the propeller, thereby achieving superior fluid flow characteristics (which minimizes system vibration), creating less resistance against the propeller structure, and providing a greater surrounding centrifugal fluid force to assure that marine life avoids the center of the propeller system.

On the other hand, propellers having fin arrays arranged such that fins closest to the hub have the greatest eccentricity measured relative to the plane of the propeller as a whole, and then flattening out as the fins are arranged toward the outside of the propeller system (as is typical with a boat or submarine propeller, for example) may also yield the best results in terms of vibration reduction, harmonics and overall system performance.

In the example embodiment 701 depicted in FIG. 7 (which is representative of the boxed region 603 in FIG. 6), a series of curved fins 702, 704, 706, 708 are disposed between gaps 703, 705, 707, 709 of increasing size (note that the center attachment hub from which the smallest concentric rings originate would be located beyond the top of the Figure, e.g., above fin 702 and gap 703).

In the depicted embodiment, fins 702, 704, 706, 708 are also disposed with greater eccentricity as they are installed further and further from the hub, so that the disposition angle of fin 708 measured relative to the assembly plane would be greater than that of fins 702, 704, 706 disposed neared the center attachment hub.

Figure 8:
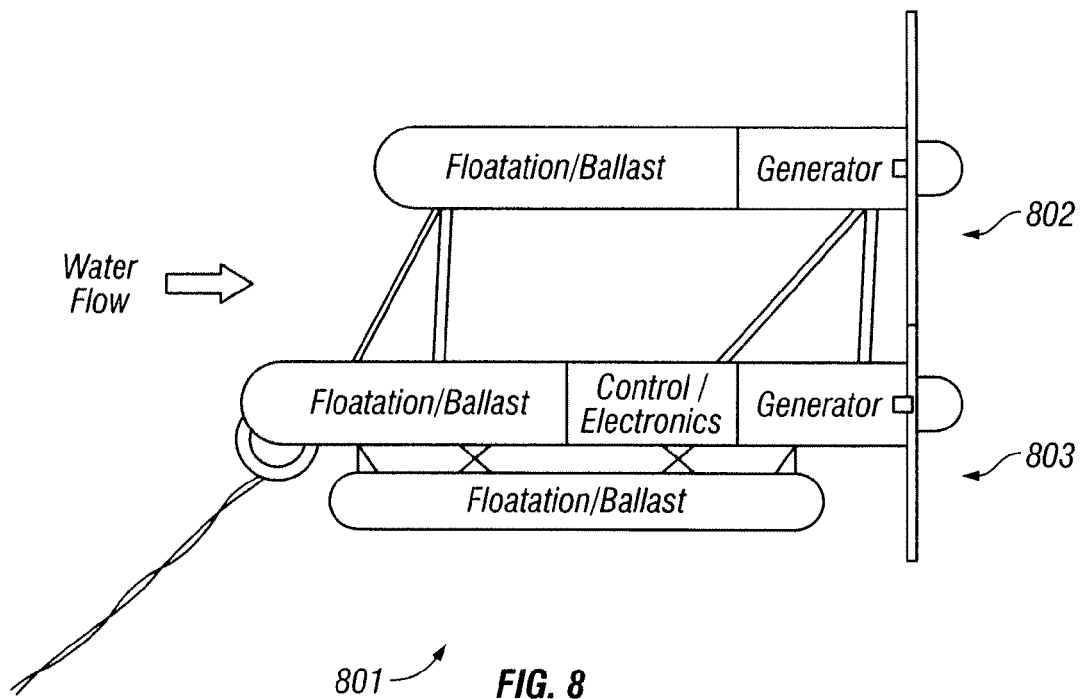
FIG. 8 is a side view of an example water current power generation system further comprising a drag mounted propeller array.

In the example embodiment depicted in FIG. 8, a tethered, submerged water current power generation system is provided in which the entire propeller array is drag mounted, so that power interference from a front mounted array is avoided, and greater system stability and power efficiency is achieved. As seen, this particular configuration admits to one or more propellers disposed in both an upper drag mount position and a lower drag mount position, though disposition of multiple propeller arrays in either a greater or fewer number of levels is also possible.

Figure 9:
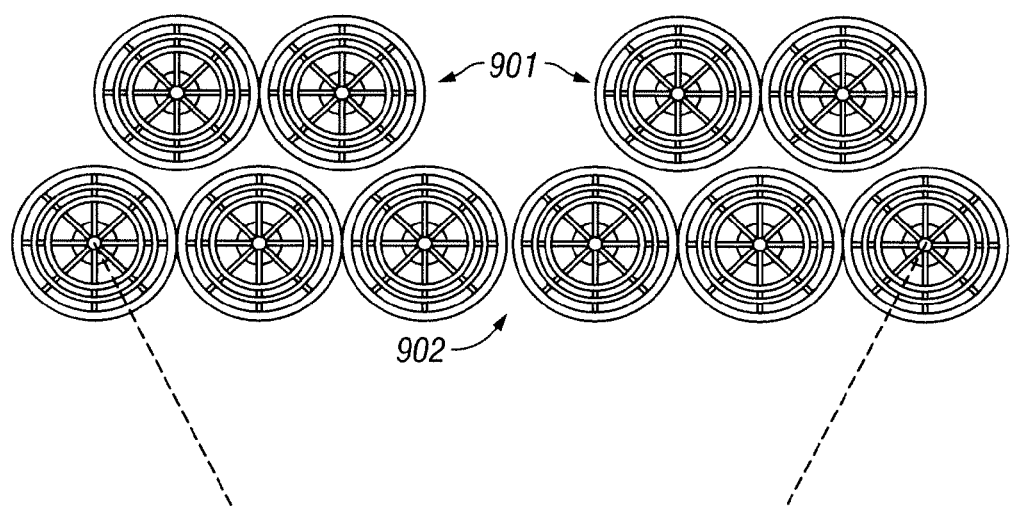
FIG. 9 is a rear view of the example water current power generation system depicted in FIG. 8, wherein an even number of propellers facilitate offsetting rotational forces in a drag mounted array

In FIG. 9, which is essentially a rear view of the alternative embodiment depicted in FIG. 8, it is seen that one specific though non-limiting embodiment comprises a propeller array having ten total propellers, with six propellers being disposed in a lower drag mount position, and four propellers being disposed in an upper drag mounted position, with the upper position array being further distributed with two propellers on each side of the power generation system.

This particular embodiment has been found to admit to superior power generation characteristics, while stabilizing the attendant system structure by minimizing vibration, and allowing evenly matched pairs of propellers to run in opposite rotational directions.

While such configurations are optimal for certain embodiments of a power generation system, a virtually limitless number of other arrays and disposition configurations can instead be employed when deemed effective in a given operational environment.

As a practical matter, the composition of the entire fin-ring propeller structure would likely be common, for example, all made from a durable, coated or rust-resistant, lightweight metal. However, differing material compositions between fins and rings is also possible, and other materials such as metallic composites, hard carbon composites, ceramics, etc., are certainly possible without departing from the scope of the instant disclosure.

Figure 10:
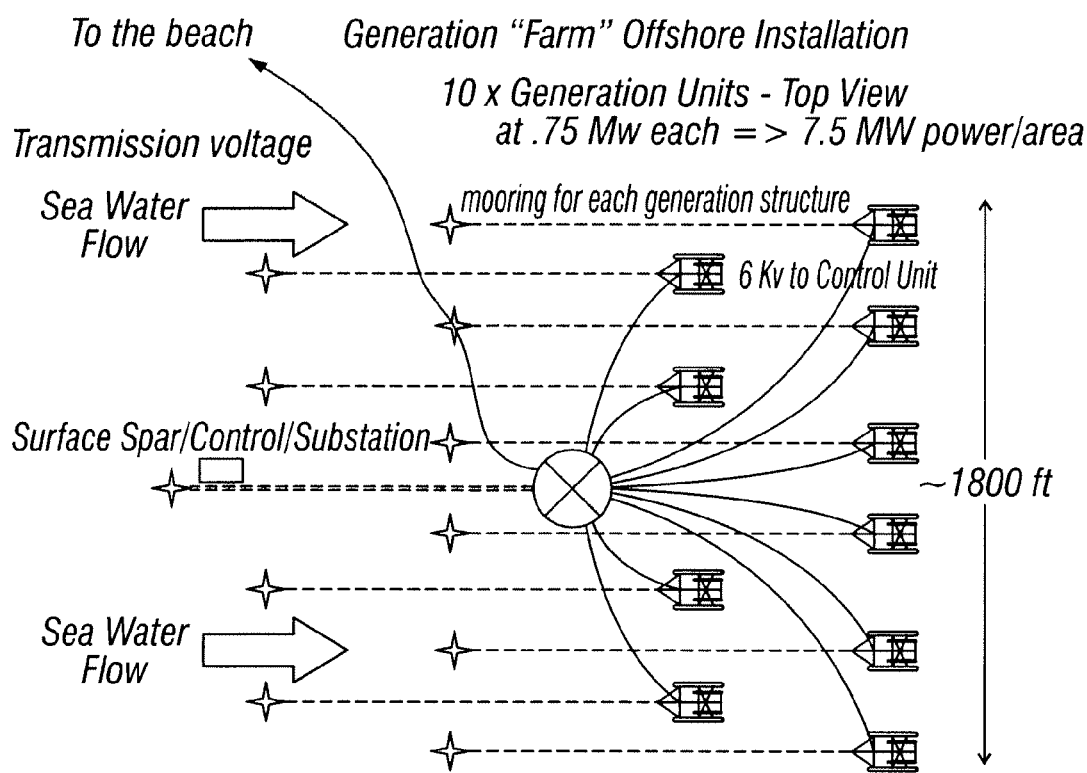
FIG. 10 is a schematic view of an example water current power generation farm comprising a plurality of linked power generation systems.

As depicted in FIG. 10, when there is a need for a number of power generation structures in an area, the power system can be consolidated for efficiency, with power and control connections being linked back to a central location, such as a control substation, established near the installed units. This consolidation of units can occur either on the ocean floor, or on (or near) a mid-water floating structure.

The control substation can be installed on a floating surface structure like a SPAR, or it can be a submerged control substation, possibly using a buoy system, which can be floated to the surface for maintenance, or even fixed upon the ocean floor.

In deep water, an ocean floor common connection installation would require more power cables and additional control systems that would increase the cost and complexity of the system, and would be harder to maintain than an installation constructed nearer currents at the ocean surface.

A mid-floating structure constructed using elements similar to the flotation skids associated with the generation units would provide a common power collection location while not leaving any permanent structure penetrating the water surface. This configuration would also require fewer long power and control lines run to the ocean floor, and would leave plenty of draft for ships in the area.

The third type of common collection location comprises a structure that is moored to the ocean floor and floats on the ocean surface near the generation units. This approach could comprise many types of different structures, but a SPAR (as shown in FIG. 10) would have some of the best characteristics for design and stability during weather events and hurricanes because of its reduced wind and wave profile.

A power consolidated station allows for transformation to a higher transmission voltage, thereby achieving superior and scalable power transfer capacity to a land connected power transmission grid. Allowing for higher transmission voltages also provides installations located further from land with good power transmission results. Ultimate power transformation can be performed in either the consolidation station or one or more power transformers installed on an ocean floor mud mat.

Depending upon other variables, there may also be a need for a land based synchronous device (such as a large synchronous motor or a large variable speed electronic driver) used to stabilize the power grid when offshore ocean current generation is significantly greater than the onshore generation grid.

For significant lengths out at sea, it is possible to have a DC high voltage power transmission connection run from the consolidation structure all the way back to the beach. The AC power needed for the individual generation units can be generated from the DC voltage to three-phase AC in order to power the induction generators. At the beach (or near the beach, or even thereafter), the DC is connected to the power grid or smart grid like a typical DC power interconnect.

Figure 11:
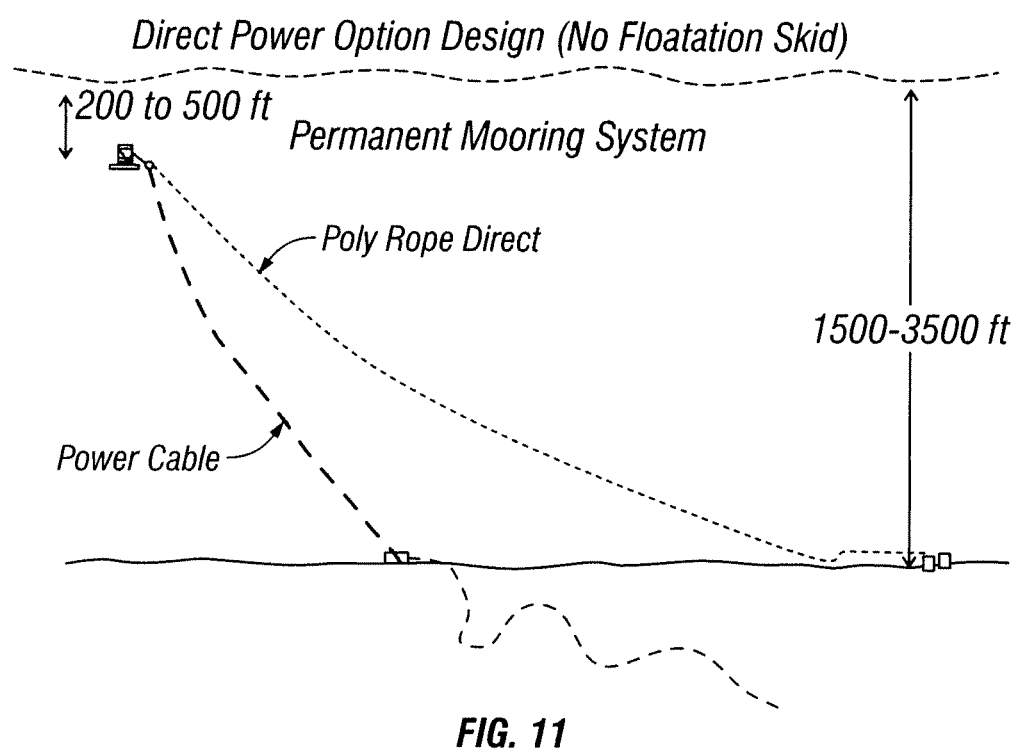
FIG. 11 is a schematic view of a permanently moored direct power generation system in which no flotation skid or Spar is used.

As depicted in FIG. 11, in deeper ocean locations, a SPAR need not be supported by flotation skids, and could therefore serve as a consolidation facility useful for scalably connecting and disconnecting a plurality of individual power generation units. As shown, a SPAR submerged approximately 200-500 feet can be permanently moored to the ocean floor using a strong, secure mooring means, such as a thick poly rope. If the poly rope is first wound in one direction and then covered with a second rope wound in the opposite direction, the combined, alternately wound line will be very strong, and will resist twisting and knotting.

Recognizing that the weight of steel cabling would affect design aspects with regard to flotation for the consolidation facility, it is also possible to integrate a stranded steel cable mooring line with a power cable enclosed within the center. Poly mooring cable might not be appropriate for this application due to its propensity to stretch.

A separate power cable is run from the SPAR to a transformer or transmission box installed on the bottom of the sea floor, and then run beneath the sea floor toward its ultimate destination.

Yet another approach is to run the power cable through an interior void of a poly rope or other mooring line, so that there is only a single line extending from the SPAR, and the power cable is protected from damage by the mooring line.

Figure 12:
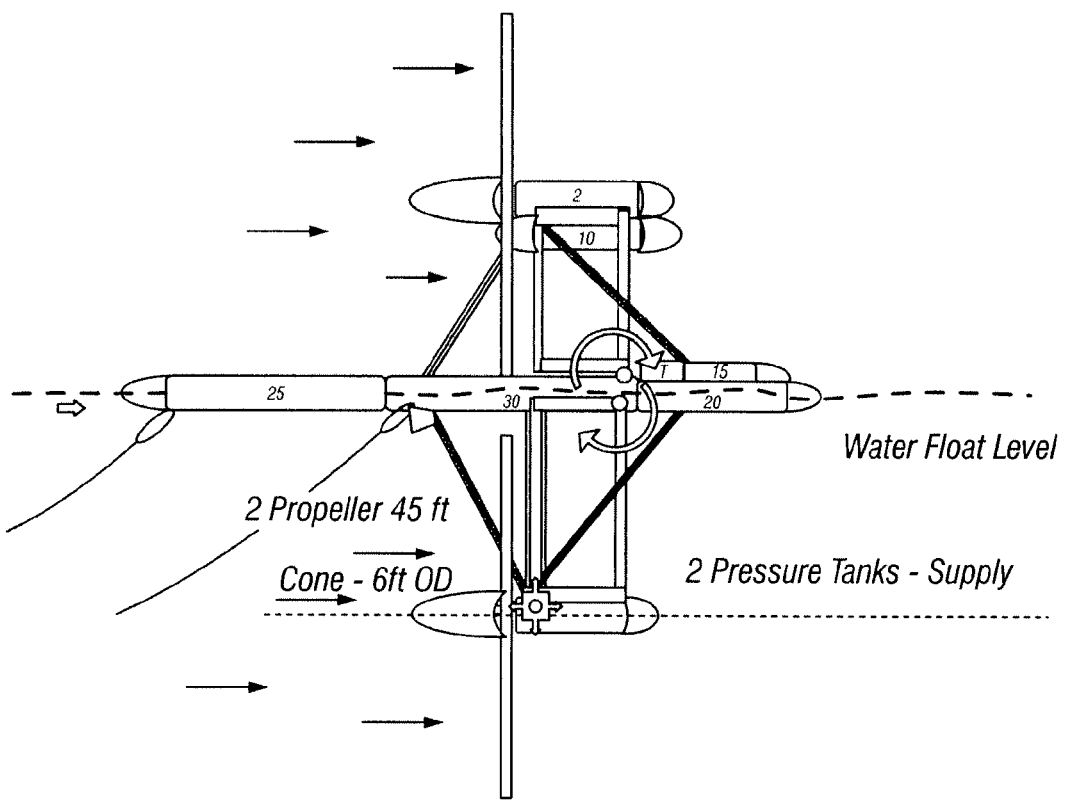
FIG. 12 is a side view of a four-unit flip design power generation system.

Turning now to a more powerful, single-station type induction power generation system, (e.g., an embodiment utilizing 40-foot and larger propellers), FIG. 12 is a side view of a four-unit flip design power generation system in which a plurality of front mounted induction generators are disposed upon a frame established by flotation skids with connecting members.

At least four 40-foot or larger propellers (depending on current), along with associated generation units, are disposed in mechanical communication with a rotatable shaft or the like and can be rotated, either mechanically or using a logic control system disposed in communication with a pneumatic or hydraulic control system, in order to essentially become top and bottom horizontal axial turbines; then, using the ballast system, the structure can be floated to the surface for safe and efficient access to the generation pods for maintenance and repair.

Figure 13:
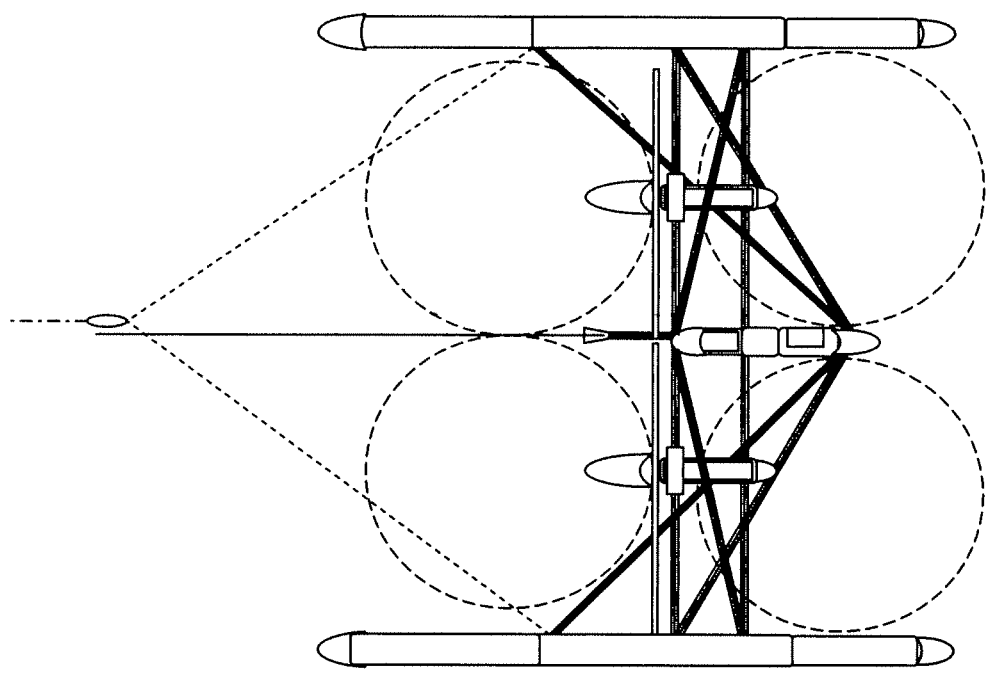
FIG. 13 is a top view of FIG. 12, again comprising a four-unit flip design power generation and propeller system

FIG. 13 is a top view of the same structure, showing how to expand system capacities to a 6 or 8 propeller design, or even larger.

Figure 14:
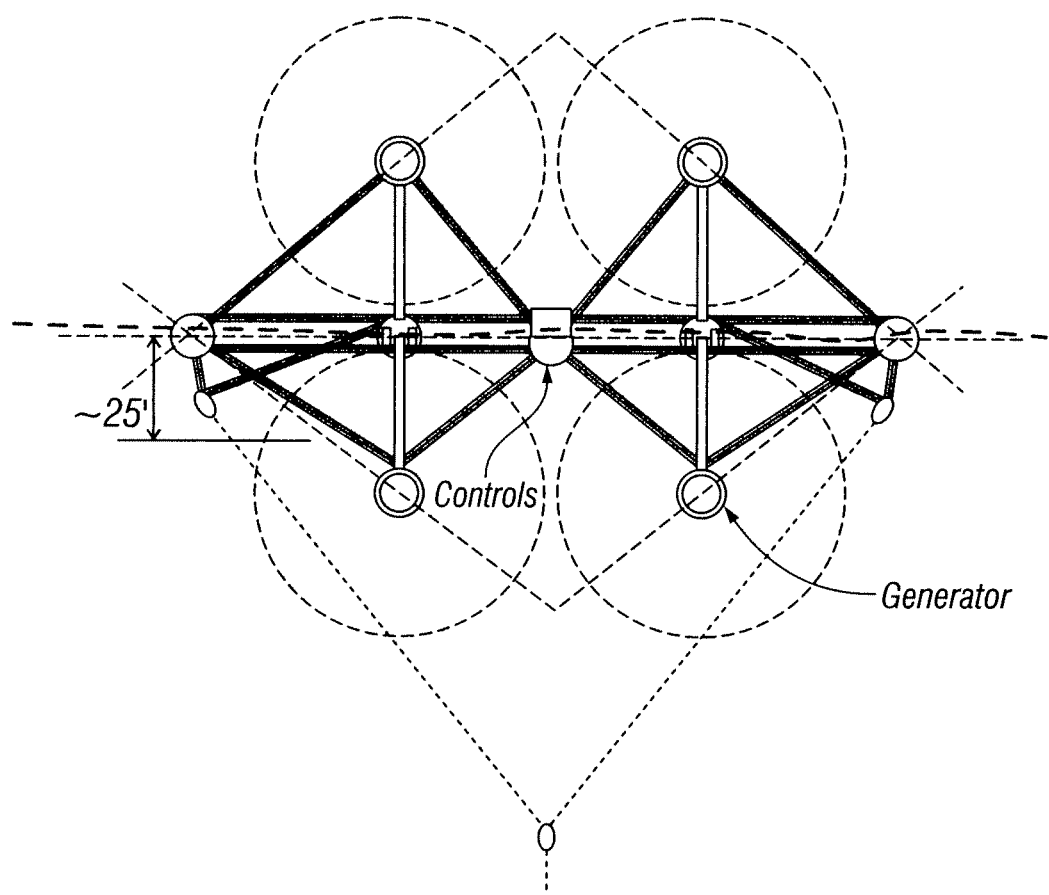
FIG. 14 is a front view of a four-unit flip design power generation and propeller system.

FIG. 14 depicts a front view of the four unit flip design power generation and propeller system, showing the propellers on a vertical plane while in service and attached to a Y-type mooring line for stability. In some embodiments, as more propellers are added to the system, a spreader bar or other similar apparatus is used to impart additional stability.

Figure 15:
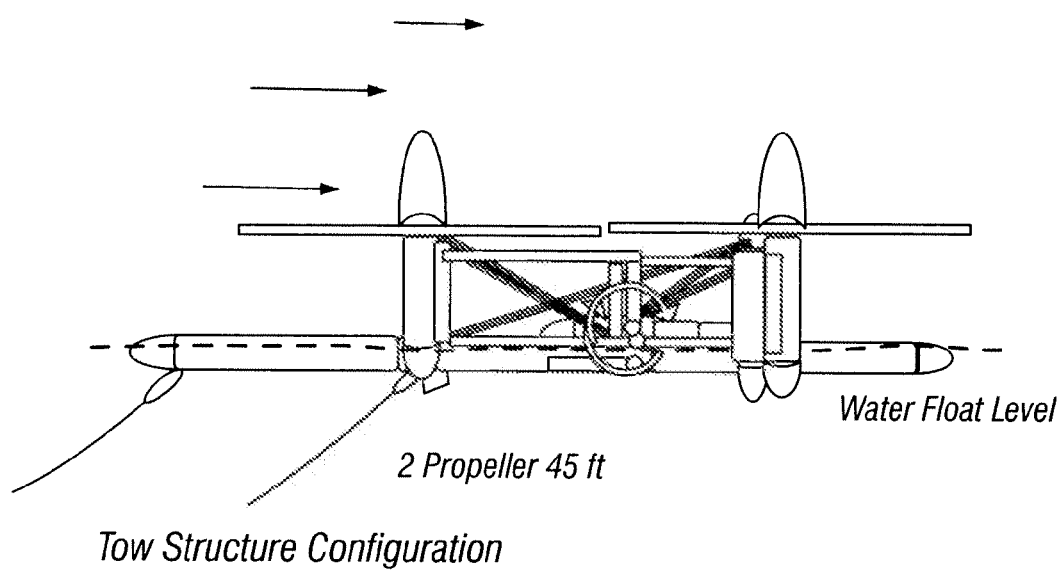
FIG. 15 is a four-unit flip design power generation and propeller system, showing the generator pods and associated propellers in a flipped position suitable for installation and maintenance.

In FIG. 15, the four unit flip design power generation and propeller system is depicted in repose, shown now as flipped into a configuration useful for transportation, installation and maintenance. In one embodiment, the generator pods are attached to the system frame such that they can rotate approximately ninety degrees or more about a shaft disposed in communication with the frame. This rotation can be accomplished either manually, or using a logic control system to rotate the pods about the shaft using an associated rotation means such as a pneumatic rotation means or a hydraulic rotation means.

In another embodiment, ballasts are manipulated within the flotation skids so the generation pods and the propellers turn upward, as would be required for controlled towing when the structure is being delivered to the field, or when maintenance to the propellers, generators, gearing, etc., is necessary. Thus, when the generation pods and propellers are mostly or fully above the surface level, the propellers do not cause instability to the entire structure due to wind resistance, etc.

While still other aspects of the invention, which in current practice typically comprise devices associated with underwater energy production generally (for example, auxiliary power supply sources, fiber optic control and communication systems, attendant remote-operated vehicles used to service the power station, etc.), are certainly contemplated as peripherals for use in the deployment, positioning, control and operation of the system, it is not deemed necessary to describe all such items in great detail as such other systems and subsystems will naturally occur to those of ordinary skill in the pertinent arts.

Though the present invention has been depicted and described in detail above with respect to several exemplary embodiments, those of ordinary skill in the art will also appreciate that minor changes to the description, and various other modifications, omissions and additions may also be made without departing from either the spirit or scope thereof.

The invention claimed is:

1. A consolidation facility for consolidating power generated by a plurality of water current power generation systems, each of said power generation systems comprising one or more submerged flotation chambers; one or more submerged induction type power generation units disposed in communication with said flotation chambers; one or more propellers disposed in communication with said induction type power generator units; a mooring system; and a generated power output means, said consolidation facility further comprising:
   means for receiving power generated by said power generation systems and transferred to said consolidation facility by said generated power output means.

2. The consolidation facility of claim 1, wherein said facility is installed on a floor surface of a body of water.

3. The consolidation facility of claim 1, wherein said facility is submerged within a body of water between the water body floor surface and the surface of the water.

4. The consolidation facility of claim 1, wherein said facility further comprises:
  one or more submerged flotation chambers, wherein one or more of said submerged flotation chambers further comprises one or more buoyant fluid isolation chambers, and wherein one or more of said isolation chambers further comprises a buoyant fluid disposed therein, a buoyant fluid intake valve, a buoyant fluid exit valve, and a buoyant fluid source control means.

5. The consolidation facility of claim 1, wherein said facility floats on a water surface near the submerged water current power generation systems.

6. The consolidation facility of claim 5, wherein said facility is a SPAR.

7. The consolidation facility of claim 5, wherein said facility is moored to a water body floor surface.

8. The consolidation facility of claim 7, wherein said facility is moored by a poly rope comprising two layers, with a first layer being wound in a clockwise direction and a second layer being wound in a counterclockwise direction.

9. The consolidation facility of claim 1, further comprising means for transferring consolidated power obtained from said plurality of water current power generation systems to a power grid.

10. The consolidation facility of claim 1, further comprising means for transferring consolidated power obtained from said plurality of water current power generation systems to one or more power transformation devices.

11. The consolidation facility of claim 10, wherein said one or more power transformation devices transforms transferred power to a higher transmission voltage.

12. The consolidation facility of claim 10, wherein said one or more power transformation devices transforms transferred power to a lower transmission voltage.

* * * * *